(12) United States Patent
Foster

(10) Patent No.: US 11,301,645 B2
(45) Date of Patent: Apr. 12, 2022

(54) LANGUAGE TRANSLATION ASSEMBLY

(71) Applicant: Aziza Foster, East Orange, NJ (US)

(72) Inventor: Aziza Foster, East Orange, NJ (US)

( * ) Notice: Subject to any disclaimer, the term of this patent is extended or adjusted under 35 U.S.C. 154(b) by 148 days.

(21) Appl. No.: 16/807,380

(22) Filed: Mar. 3, 2020

(65) Prior Publication Data
US 2021/0279428 A1 Sep. 9, 2021

(51) Int. Cl.
*G06F 40/58* (2020.01)
*G10L 15/00* (2013.01)
*H04R 1/10* (2006.01)
*G10L 13/00* (2006.01)
*G10L 15/26* (2006.01)

(52) U.S. Cl.
CPC ............... *G06F 40/58* (2020.01); *G10L 13/00* (2013.01); *G10L 15/005* (2013.01); *G10L 15/26* (2013.01); *H04R 1/105* (2013.01); *H04R 1/1075* (2013.01)

(58) Field of Classification Search
CPC ........ G06F 3/162; G06F 40/58; G06F 1/1656; G06F 3/0481; G06F 40/45; G10L 13/00; G10L 15/005; G10L 15/26; G10L 13/047; G10L 15/187; G10L 15/22; G10L 21/06; H04R 1/10; H04R 1/105; H04R 1/1008; H04R 1/1075; H04R 1/24; H04R 1/1025; H04R 1/1041; A61B 5/4815; G02B 27/017; G02B 27/0176; G06T 19/006; G09B 5/062; G09B 7/04; G09B 19/06; H04L 67/16; H04M 1/6066
USPC ......... 381/380; 434/156, 157; 704/2, 3, 277, 704/258, 269, 270
See application file for complete search history.

(56) References Cited

U.S. PATENT DOCUMENTS

| | | | |
|---|---|---|---|
| 7,552,053 B2* | 6/2009 | Gao | G10L 15/26 704/258 |
| D647,513 S | 10/2011 | Ha | |
| 8,165,867 B1* | 4/2012 | Fish | G06F 40/58 704/3 |
| 8,165,868 B2 | 4/2012 | Donohoe | |
| 8,275,603 B2 | 9/2012 | Furihata | |
| 8,311,798 B2 | 11/2012 | Pedre | |
| 10,334,349 B1* | 6/2019 | Crowder | G06F 3/165 |
| 2001/0008753 A1* | 7/2001 | Wakamoto | G09B 19/06 434/156 |
| 2003/0065504 A1 | 4/2003 | Kraemer | |
| 2003/0115059 A1 | 6/2003 | Jayaratne | |
| 2003/0125959 A1* | 7/2003 | Palmquist | G10L 13/00 704/277 |
| 2004/0034535 A1* | 2/2004 | Belenger | G10L 21/06 704/277 |

(Continued)

*Primary Examiner* — Gerald Gauthier

(57) ABSTRACT

A language translation assembly includes a housing that is wearable on a user's ear. A control circuit is positioned within the housing and the control circuit stores a language translation program. A retainer is coupled to the housing and the retainer is positionable around the user's ear for retaining the housing on the user's ear. A microphone is coupled to the housing to sense audile sounds. A speaker is coupled to the housing to emit words translated into the native language of the user when the microphone senses spoken words in a non-native language with respect to the user. The operational software selects an appropriate response in the user's native language from the language database. Additionally, the speaker emits the appropriate response to instruct the user to speak in the non-native language.

1 Claim, 3 Drawing Sheets

(56) References Cited

U.S. PATENT DOCUMENTS

| | | | |
|---|---|---|---|
| 2004/0093214 A1* | 5/2004 | Belenger | G10L 21/06 704/269 |
| 2007/0255570 A1* | 11/2007 | Annaz | G09B 19/06 704/270 |
| 2009/0285437 A1* | 11/2009 | Takigawa | H04R 1/1041 381/380 |
| 2010/0169073 A1* | 7/2010 | Almagro | G06F 40/58 704/3 |
| 2010/0185432 A1* | 7/2010 | Almagro | H04R 5/033 704/2 |
| 2010/0250231 A1* | 9/2010 | Almagro | G06F 40/58 704/2 |
| 2011/0238405 A1 | 9/2011 | Pedre | |
| 2012/0330645 A1* | 12/2012 | Belisle | H04M 1/6066 704/3 |
| 2013/0173246 A1* | 7/2013 | Leung | G06F 40/58 704/2 |
| 2014/0120502 A1* | 5/2014 | Prince | G09B 5/062 434/157 |
| 2015/0073770 A1* | 3/2015 | Pulz | G10L 13/086 704/3 |
| 2016/0110349 A1* | 4/2016 | Norman-Rosedam | G06F 40/58 704/3 |
| 2017/0039766 A1* | 2/2017 | Passmore | G06F 1/1688 |
| 2017/0277257 A1* | 9/2017 | Ota | G06F 1/163 |
| 2017/0359644 A1* | 12/2017 | Cramer | H04R 1/105 |
| 2018/0158365 A1* | 6/2018 | Roche | G09B 17/003 |
| 2018/0365232 A1* | 12/2018 | Lewis | G06F 40/58 |
| 2019/0268706 A1* | 8/2019 | Solum | A61B 5/6815 |
| 2019/0268707 A1* | 8/2019 | Solum | H04R 25/554 |
| 2019/0354592 A1* | 11/2019 | Musham | G06F 40/58 |
| 2020/0029156 A1* | 1/2020 | Wang | G10L 25/48 |
| 2020/0134026 A1* | 4/2020 | Lovitt | G06F 40/58 |
| 2020/0320984 A1* | 10/2020 | Kuczmarski | G10L 15/1822 |
| 2020/0376369 A1* | 12/2020 | Reddan | A63F 13/67 |
| 2021/0182488 A1* | 6/2021 | Gharpure | G06F 40/284 |
| 2021/0195308 A1* | 6/2021 | Solis | H04R 1/2811 |
| 2021/0279428 A1* | 9/2021 | Foster | G10L 15/005 |

\* cited by examiner

LANGUAGE TRANSLATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to translation device and more particularly pertains to a new translation device for translating spoken words and emitting an appropriate response to facilitate a user to communicate in a non-native language.

(2) Description of Related Art Including Information Disclosed Under 37 CFR 1.97 and 1.98

The prior art relates to translation device.

BRIEF SUMMARY OF THE INVENTION

An embodiment of the disclosure meets the needs presented above by generally comprising a housing that is wearable on a user's ear. A control circuit is positioned within the housing and the control circuit stores a language translation program. A retainer is coupled to the housing and the retainer is positionable around the user's ear for retaining the housing on the user's ear. A microphone is coupled to the housing to sense audile sounds. A speaker is coupled to the housing to emit words translated into the native language of the user when the microphone senses spoken words in a non-native language with respect to the user. The operational software selects an appropriate response in the user's native language from the language database. Additionally, the speaker emits the appropriate response to instruct the user to speak in the non-native language.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
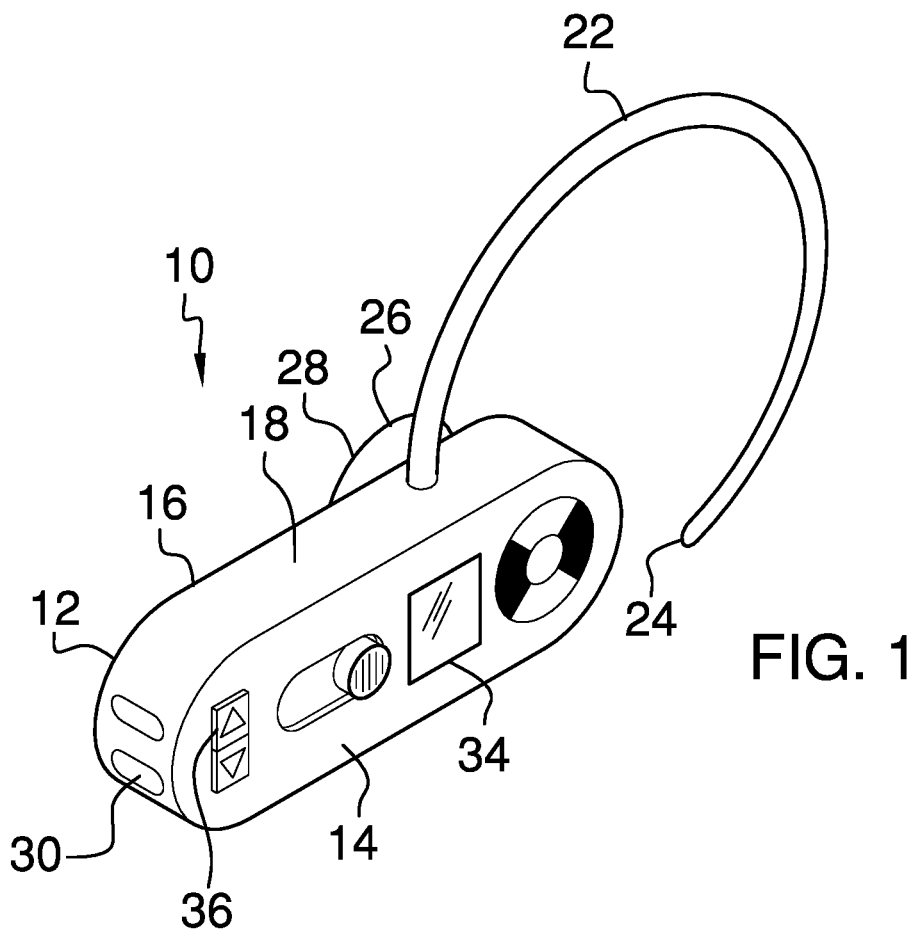
FIG. 1 is a front perspective view of a language translation assembly according to an embodiment of the disclosure.
Figure 2:
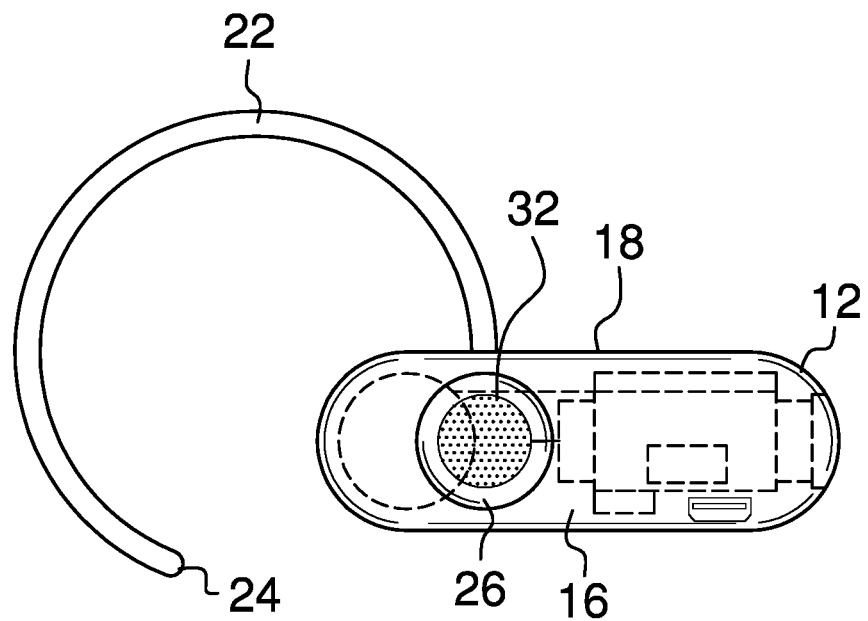
FIG. 2 is a back phantom view of an embodiment of the disclosure.
Figure 3:
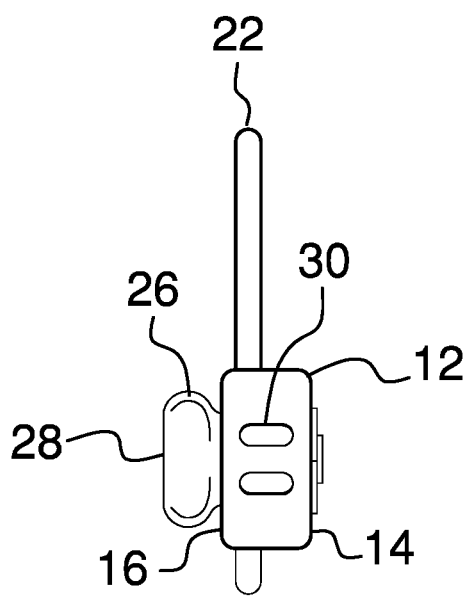
FIG. 3 is a right side view of an embodiment of the disclosure.
Figure 4:
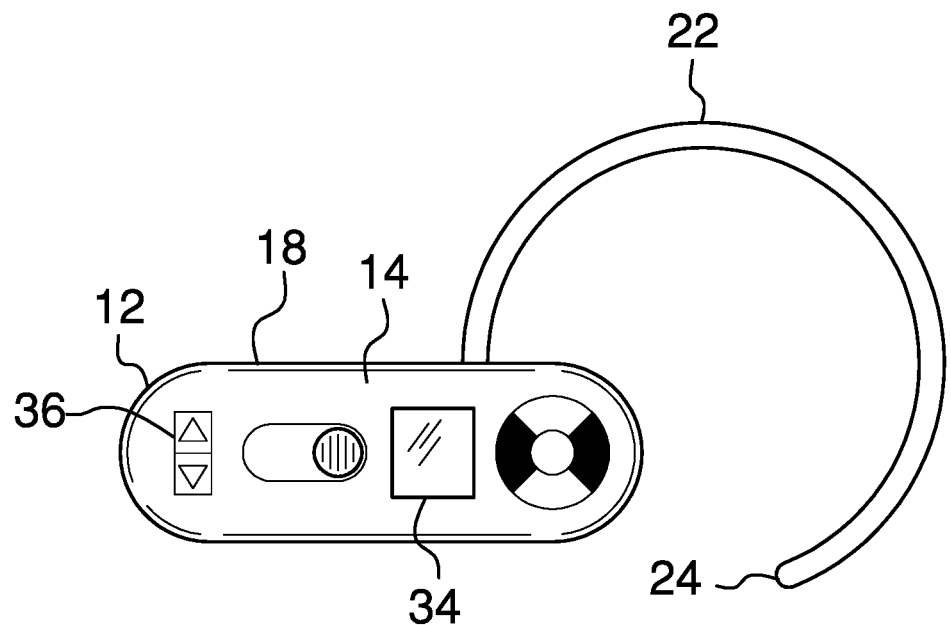
FIG. 4 is a front view of an embodiment of the disclosure.
Figure 5:
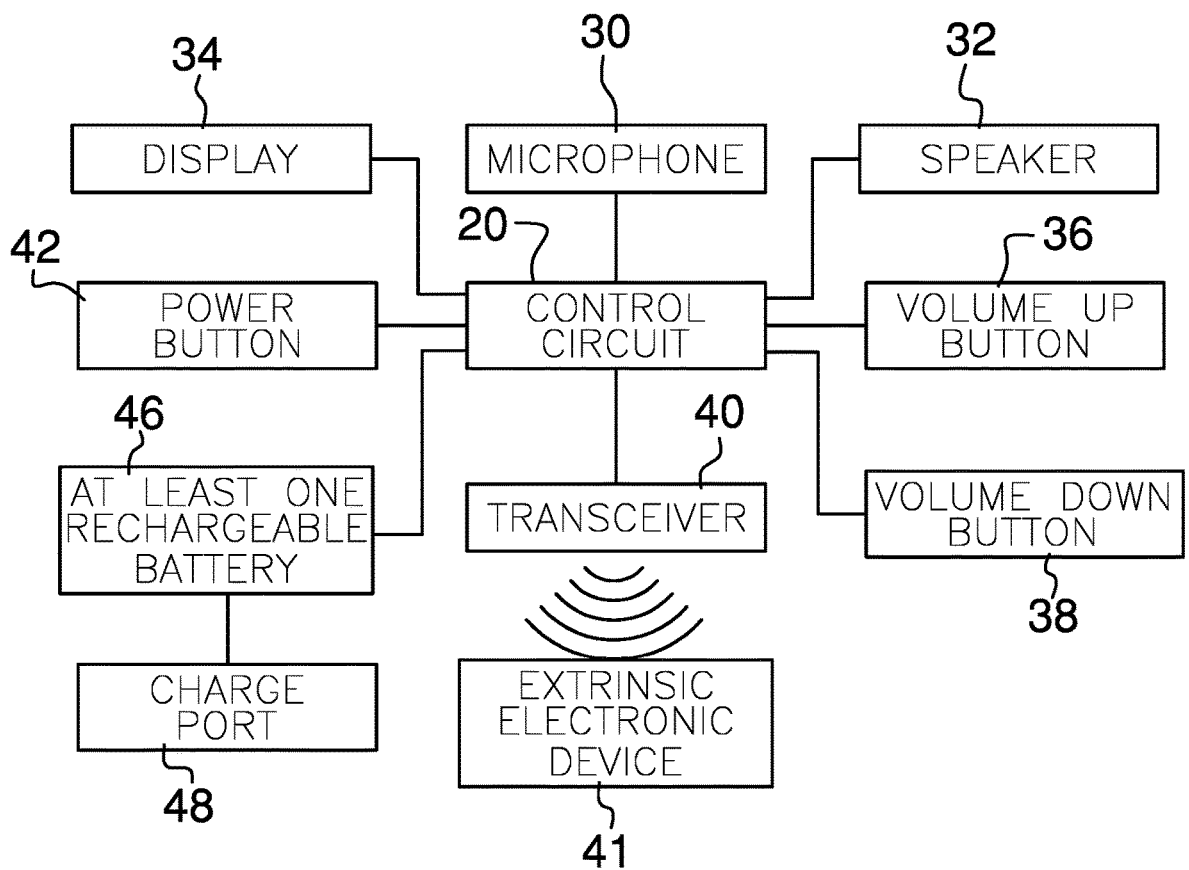
FIG. 5 is a schematic view of an embodiment of the disclosure.

With reference now to the drawings, and in particular to FIGS. 1 through 5 thereof, a new translation device embodying the principles and concepts of an embodiment of the disclosure and generally designated by the reference numeral 10 will be described.

As best illustrated in FIGS. 1 through 5, the language translation assembly 10 generally comprises a housing 12 that is wearable on a user's ear. The housing 12 has a front wall 14, a back wall 16 and a top wall 18. A control circuit 20 is positioned within the housing 12 and the control circuit 20 stores data comprising a language database. The language database includes words in a plurality of languages. Additionally, the control circuit 20 stores operational software comprising a language translation program. The control circuit 20 receives a translation input. The control circuit may include an electronic memory for storing the language database and the operational software.

A retainer 22 is coupled to the housing 12 and the retainer 22 is positionable around the user's ear for retaining the housing 12 on the user's ear. The retainer 22 extends upwardly from the top wall 18 of the housing 12 and the retainer 22 has a distal end 24 with respect to the top wall 18. Additionally, the retainer 22 is curved between the top wall 18 and the distal end 24 such that the retainer 22 forms an open loop for conforming to curvature of the user's ear.

A horn 26 is coupled to the housing 12 and the horn 26 extends into the user's outer ear when the housing 12 is worn on the user's ear. The horn 26 extends away from the back wall 16 of the housing 12 and the horn 26 has a distal end 28 with respect to the back wall 16. The horn 26 flares outwardly between the back wall 16 and the distal end 28 of the horn 26. Additionally, the horn 26 is comprised of a flexible material to enhance comfort for the user.

A microphone 30 is coupled to the housing 12 to sense audile sounds. The microphone 30 is positioned on the front wall 14 of the housing 12 such that the microphone 30 is exposed when the user wears the housing 12. In this way the microphone 30 can sense words that are spoken to the user. Moreover, the control circuit 20 receives the translation input when the microphone 30 senses the words that are being spoken to the user. The microphone 30 may be an electronic microphone 30 or the like.

A speaker 32 is coupled to the housing 12 to emit audible sounds outwardly therefrom. The speaker 32 emits words translated into the native language of the user when the microphone 30 senses spoken words in a non-native language with respect to the user. Thus, the speaker 32 translates the non-native language into the users' native language. Additionally, the operational software selects an appropriate response in the user's native language from the language database. The speaker 32 emits the appropriate response thereby instructing the user to speak in the non-native language. In this way the user can effectively communicate with an individual that speaks a language other than the user's native language. The speaker 32 is aligned with the horn 26 to direct the audible sounds into the user's ear.

A display 34 is coupled to the front wall 14 of the housing 12 and the display 34 is electrically coupled to the control circuit 20. The display 34 displays indicia comprising words relating to operational parameters of the control circuit 20. Additionally, the display 34 may comprise an LED or other similar electronic display. A volume up button 36 is coupled to the front wall 14 of the housing 12 and the volume up button 36 is electrically coupled to the control circuit 20. The volume up button 36 increases a volume of the speaker 32 when the volume up button 36 is depressed. A volume down button 38 is coupled to the front wall 14 of the housing 12 and the volume down button 38 is electrically coupled to the control circuit 20. The volume down button 38 decreases a volume of the speaker 32 when the volume down button 38 is depressed.

A transceiver 40 is coupled to the housing 12 and the transceiver 40 is electrically coupled to the control circuit 20. The transceiver 40 is in wireless communication with an extrinsic electronic device 41, such as a smart phone or the like. The transceiver 40 may be a radio frequency transceiver 40 or the like and the transceiver 40 may employ Bluetooth communication protocols. Additionally, the transceiver 40 may facilitate the transfer of data between the control circuit 20 and the extrinsic electronic device for adding language data to the language database.

A power button 42 is slidably coupled to the front wall 14 of the housing 12 and the power button 42 is electrically coupled to the control circuit 20 for turning the control circuit 20 on and off. A power supply 44 is positioned in the housing 12 and the power supply 44 is electrically coupled to the control circuit 20. The power supply 44 comprises at least one rechargeable battery 46 and the at least one rechargeable battery 46 is electrically coupled to the control circuit 20. A charge port 48 is recessed into the housing 12 for insertably receiving a charge cord. The charge port 48 is electrically coupled to the at least one rechargeable battery 46 for charging the at least one rechargeable battery 46. The charge port 48 may be a usb port or the like and the charge cord may be a cord of a battery charger.

In use, the retainer 22 is positioned around the user's ear such that the horn 26 is inserted into the user's outer ear. The control circuit 20 receives the translation input when the microphone 30 detects words that are spoken in a language other than the native language of the user. Thus, the translation software translates the spoken words into the user's native language and the speaker 32 emits the translated words into the user's ear. In this way the user can understand the words being spoken to the user. The language translation software selects an appropriate response to the spoken words and the speaker 32 emits the appropriate response into the user's ear. The user speaks aloud the appropriate response thereby facilitating the user to verbally communicate in a language that the user would otherwise not understand or be able to speak.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A language translation assembly being configured to be worn on a user's ear for translating words spoken to a user into the user's native language and subsequently emitting a response in the spoken language, said assembly comprising:
   a housing being wearable on a user's ear, said housing having a front wall, a back wall and a top wall;
   a control circuit being positioned within said housing, said control circuit storing data comprising a language database, said language database including words in a plurality of languages, said control circuit storing operational software comprising a language translation program, said control circuit receiving a translation input;
   a retainer being coupled to said housing, said retainer being positionable around the user's ear for retaining said housing on the user's ear, said retainer extending upwardly from said top wall of said housing, said retainer having a distal end with respect to said top wall, said retainer being curved between said top wall and said distal end such that said retainer forms an open loop wherein said retainer is configured to conform to curvature of the user's ear;
   a horn being coupled to said housing wherein said horn is configured to extend into the user's outer ear when said housing is worn on the user's ear, said horn extending away from said back wall of said housing, said horn having a distal end with respect to said back wall, said horn flaring outwardly between said back wall and said distal end of said horn, said horn being comprised of a flexible material wherein said horn is configured to enhance comfort for the user;
   a microphone being coupled to said housing wherein said microphone is configured to sense audile sounds, said microphone being positioned on said front wall of said housing such that said microphone is exposed when the user wears said housing wherein said microphone is configured to sense words being spoken to the user, said control circuit receiving said translation input when said microphone senses the words being spoken to the user;

a speaker being coupled to said housing wherein speaker is configured to emit audible sounds outwardly therefrom, said speaker emitting words translated into the native language of the user when said microphone senses spoken words in a non-native language with respect to the user wherein said speaker is configured to translate the non-native language into the native language, said operational software selecting an appropriate response in the user's native language from said language database, said speaker emitting said appropriate response wherein said speaker is configured to instruct the user to speak in the non-native language, said speaker being aligned with said horn wherein said speaker is configured to direct the audible sounds into the user's ear;

a display being coupled to said front wall of said housing, said display being electrically coupled to said control circuit, said display displaying indicia comprising words relating to operational parameters of said control circuit;

a volume up button being coupled to said front wall of said housing, said volume up button being electrically coupled to said control circuit, said volume up button increasing a volume of said speaker when said volume up button is depressed;

a volume down button being coupled to said front wall of said housing, said volume down button being electrically coupled to said control circuit, said volume down button decreasing a volume of said speaker when said volume down button is depressed;

a transceiver being coupled to said housing, said transceiver being electrically coupled to said control circuit, said transceiver being configured to be in wireless communication with an extrinsic electronic device;

a power button being slidably coupled to said front wall of said housing, said power button being electrically coupled to said control circuit for turning said control circuit on and off; and a power supply being positioned in said housing, said power supply being electrically coupled to said control circuit, said power supply comprising:

at least one rechargeable battery, said at least one rechargeable battery being electrically coupled to said control circuit; and a charge port being recessed into said housing wherein said charge port is configured to insertably receive a charge cord, said charge port being electrically coupled to said at least one rechargeable battery for charging said at least one rechargeable battery.

* * * * *